Figure 4:
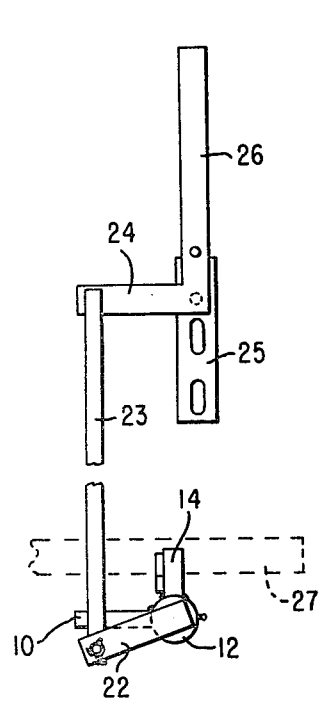

United States Patent [19]

Schilling

[11] 4,270,767
[45] Jun. 2, 1981

[54] DEVICE FOR CONTROLLING SWINGING DRAWBAR OF FARM TRACTOR

[76] Inventor: L. Louis Schilling, Box 28, Little Rock, Iowa 51243

[21] Appl. No.: 80,427

[22] Filed: Oct. 1, 1979

[51] Int. Cl.³ .............................................. B60D 1/00
[52] U.S. Cl. ................................ 280/477; 280/478 R
[58] Field of Search ............... 280/477, 478 R, 478 A, 280/478 B, 474, 462, 467, 493, 499; 74/97, 520, 491; 16/147

[56] References Cited

U.S. PATENT DOCUMENTS

| 1,570,737 | 1/1926 | Furler | 280/478 R |
| 2,678,222 | 5/1954 | Payzant | 288/499 X |
| 2,800,035 | 7/1957 | Miller | 74/491 |

Primary Examiner—Joseph F. Peters, Jr.
Assistant Examiner—Randall A. Schrecengost

[57] ABSTRACT

A device for connection to a farm tractor to allow controlled movement of a drawbar including spring loaded side tabs controlled to provide for holding the tabs out of the path of the drawbar but releasable to a position to latch the drawbar in pulling position. The tabs are formed to provide for allowing the drawbar to slide into the latched position.

5 Claims, 5 Drawing Figures

U.S. Patent  Jun. 2, 1981  4,270,767

DEVICE FOR CONTROLLING SWINGING DRAWBAR OF FARM TRACTOR

BACKGROUND AND SUMMARY OF THE INVENTION

This invention pertains to farm tractors and to a device to allow easy connection and alignment of a tractor drawbar with the pulled implement and for automatic latching of the drawbar in pulling position after connection.

Current agricultural implements, and especially wagons when loaded, are very heavy and are virtually impossible to move without power. Engagement of that power—usually a farm tractor—with the wagon or other implement is usually effected by use of a simple hitch pin running through the drawbar of the tractor and a clevis type tongue on the wagon. Thus, fairly accurate alignment of the holes in the drawbar and in the clevis is necessary.

Many wagon tongues are extensible so that some longitudinal adjustment of the tongue is possible to obtain the necessary alignment. However, lateral movement is ordinarily obtainable only by swinging the tongue to the side, thereby turning the wheels of the wagon. When fully loaded, such movement is very difficult especially with the larger wagons.

Drawbars on many tractors can be swung from side to side to provide the necessary lateral movement, but a free swinging drawbar creates difficulty while pulling the wagon in that the pivot point between the tongue and the tractor then becomes a location under the tractor instead of to the rear of the tractor. The result is that in turning corners, the wagon may trail in a position to interfere with the rear wheels of the tractor. The solution to that problem is to lock the drawbar in a straight rearward position while pulling a wagon so that the pivot point is to the rear of the tractor.

My device allows both a swinging movement of the drawbar laterally and a locked position. The device is readily controllable so that the drawbar can be released to swing and then set so that the drawbar will be latched in pulling position at the first instance when the drawbar swings past that position.

FIGURES

Figure 1:
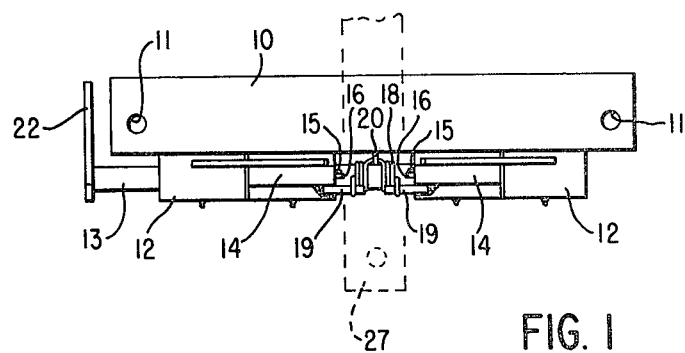
Figure 2:
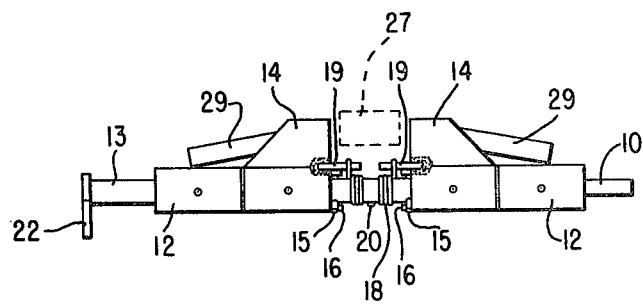
Figure 5:
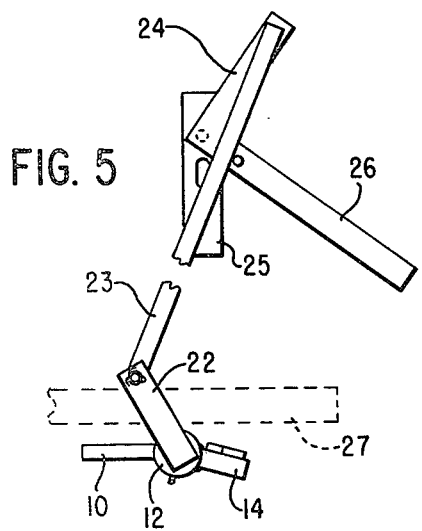
Figure 3:
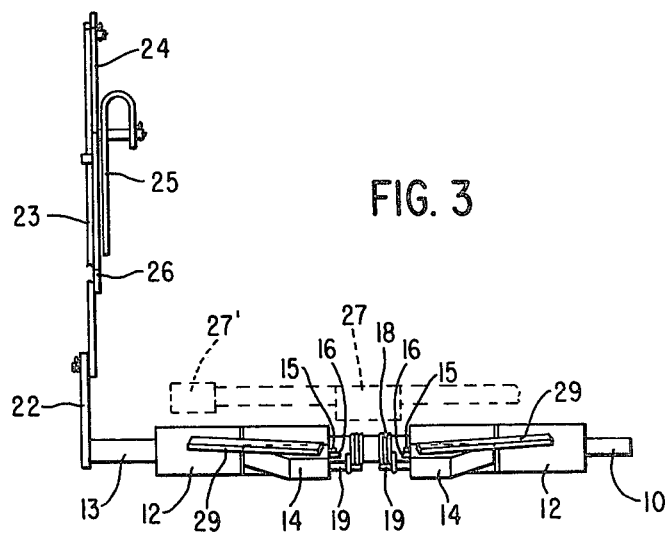

FIG. 1 is a top plan view of my device apart from the tractor and showing the tabs in the upright or pulling position, FIG. 2 is a rear elevational view of the device as shown in FIG. 1, FIG. 3 is a view similar to FIG. 2 of the device with the tabs in the lowered or released position and also showing the controls, FIG. 4 is an end elevational view of the device in the position shown in FIG. 2, and FIG. 5 is a view similar to FIG. 4 with the device in the position shown in FIG. 3.

DESCRIPTION

Briefly my device is adapted to be attached to a farm tractor near the drawbar and includes a pair of tabs normally embracing the crossbar in a pulling position. Controls are provided to allow either or both of the tabs to be depressed to allow the crossbar to swing and then to snap into upright position to lock the bar as proper alignment is reached.

More specifically, I mount my device on a cross member 10 having holes 11 allowing the device to be attached to the tractor. Bearing holders 12 are affixed to the cross member 10 and are designed to receive a shaft 13 which carries the tabs 14 journalled thereon. Thus, the shaft 13 is able to turn within the bearings at the holders 12, and the tabs 14 can also be rotated on the shaft.

In order to control the position of the tabs 14 on the shaft 13, I provide for pins 15 on the shaft and corresponding pins 16 on the tabs. A double coil spring 18 engaged between spring holding pins 19 on the tabs 14 and a holding pin 20 on the shaft 13 is arranged to press the pins 15 and 16 into normal engagement.

However, either tab 14 can be rotated on the shaft 13 against the urging 25 of the spring 18 so that the pins 15 and 16 become disengaged.

The rotative position of the tabs 14 relative to the tractor is controlled by the position of the shaft 13 unless some means forces the tabs 14 to rotate against the spring 18. The position of the shaft, in turn, is controlled by a However, either tab 14 can be rotated on the shaft 13 against the urging of the spring 18 so that the pins 15 and 16 become disengaged.

The rotative position of the tabs 14 relative to the tractor is controlled by the position of the shaft 13 unless some means forces the tabs 14 to rotate against the spring 18. The position of the shaft, in turn, is controlled by a control means operated from the seat of the tractor. This means includes an arm 22 attached to the shaft 13. A link 23 connects the arm 22 to a bell crank mechanism 24. The crank 24 is pivotally mounted on a bracket 25 which may be variously formed to be attached to various types and makes of tractor in a location well above the drawbar. On a tractor without a cab, this location may be within reach of the operator on the seat. On tractors with a cab, the arm extends upward to a point some four feet above the drawbar where an operator can readily reach it while hooking up the wagon.

In normal position, as shown in FIG. 4, the control arm 26 is in an upright position. The tabs 14 are then in a vertical position adapted to embrace the tractor drawbar 27 (FIG. 2). This is the pulling position in which the drawbar is constrained in a longitudinal location to provide the rearward pivot point for the implement tongue. However, the crank 24 can be turned by depressing the arm 26 to the position shown in FIG. 5. This pulls the arm 22 upward, rotating the shaft 13 and causes the tabs 14 to be turned to a position nearly horizontal. I prefer to proportion the parts of the bell crank 24 and the arm 22 so that the crank goes past center (FIG. 5) when the tabs 14 are fully depressed. The result is that the tabs will retain the depressed position without further manual control.

The depressed position of the tabs 14 removes them from the path of a swinging drawbar 27 so that it can be moved laterally—to the position shown at 27' in FIG. 3 for example. Thus, when the tractor is backed up to be hitched to a wagon, some lateral misalignment can be accommodated by being able to move the drawbar laterally. If the implement tongue is longitudinally adjustable, as most are now, the lateral movement of the drawbar combined with the longitudinal movement of the tongue makes it easy to align the holes in the tongue with that in the drawbar for insertion of the hitch pin.

After the hitch pin is inserted and if the drawbar is not directly on its longitudinal track, it is necessary to achieve that configuration. Release of and raising of the control arm 26 to its normal position (FIG.4) will raise the tabs 14 to a vertical position. However, if the drawbar 27 is displaced laterally, it will interfere with the raising of one tab on the side to which it is displaced. This interference simply disengages the pin 16 from pin 15 against the spring 18 and holds the tab 14 springably against the underside of the drawbar. The tractor can then be pulled forward and steered so that the drawbar comes into proper pulling alignment. At that point the tab 14 which had been depressed will be freed to snap upward under influence of the spring 18 and the drawbar will once again be constrained from lateral movement.

In order to allow reasonable proportions of the bearing holders 12 it may be necessary to extend the tabs 14 laterally to cover those holders. I do this simply by welding sloping membrs 29 to the tabs 14. However, it will be obvious that the tab could be formed intially to extend over the holder 12, or that other shapes could be used so long as the feature of having the displaced drawbar 27 hold the tab 14 in a depressed position and allowing it to spring back when aligned is retained.

I claim:

1. A drawbar controlling device to be used in connection with a tractor having a drawbar, said drawbar being laterally swingable but having a normal, longitudinally aligned, pulling position; comprising a cross member adapted to be fastened to said tractor adjacent said drawbar, shaft means including a shaft rotatably mounted on said cross member, tab means individually rotatably mounted on said shaft, said tab means including tabs adapted to embrace said drawbar to constrain it from swinging away from its longitudinally aligned position, means on said tabs and on said shaft engageable to provide a normal position for said tabs on said shaft, means engaged between said tab means and said shaft to bias said tabs to their normal position, and means controlling said shaft means whereby the shaft may be rotated to carry said tabs away from the position in which they embrace said drawbar.

2. The device of claim 1 in which said means controlling said shaft includes arm means on said shaft and control means mounted above said drawbar connected to said arm means by said shaft can be rotated.

3. The device of claim 2 in which said control means includes a bell crank having a pivot axis center, said mechanism being movable from the normal position to a position past said center by which it will be retained in the second position.

4. The device of claim 2 in which said shaft is journalled in bearing holders on said cross member.

5. The device of claim 4 in which said bearing holders surround said shaft adjacent said tabs, said tab means including members extending from said tabs in a slanted direction toward and over said bearing holders.

* * * * *